US009615021B2

(12) United States Patent
Chen et al.

(10) Patent No.: US 9,615,021 B2
(45) Date of Patent: Apr. 4, 2017

(54) IMAGE CAPTURE DEVICE WITH ADAPTIVE WHITE BALANCE CORRECTION USING A SWITCHABLE WHITE REFERENCE

(71) Applicant: Apple Inc., Cupertino, CA (US)

(72) Inventors: Cheng Chen, San Jose, CA (US); Jiaying Wu, San Jose, CA (US); John Z. Zhong, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 84 days.

(21) Appl. No.: 14/632,921

(22) Filed: Feb. 26, 2015

(65) Prior Publication Data

US 2016/0255321 A1    Sep. 1, 2016

(51) Int. Cl.
*H04N 9/73* (2006.01)
*H04N 5/232* (2006.01)
*H04N 5/225* (2006.01)
*H04N 17/00* (2006.01)

(52) U.S. Cl.
CPC ....... *H04N 5/23219* (2013.01); *H04N 5/2258* (2013.01); *H04N 9/735* (2013.01); *H04N 17/002* (2013.01)

(58) Field of Classification Search
CPC ............. H04N 17/002; H04N 5/23219; H04N 5/2258; H04N 9/735
USPC ..................................................... 348/223.1
See application file for complete search history.

(56) References Cited

U.S. PATENT DOCUMENTS

| 7,777,834 | B2 | 8/2010 | Uehara | |
|---|---|---|---|---|
| 8,520,022 | B1* | 8/2013 | Cohen | H04N 5/58 345/48 |
| 2008/0303918 | A1* | 12/2008 | Keithley | G09G 3/20 348/223.1 |
| 2011/0134205 | A1 | 6/2011 | Arney | |
| 2012/0081279 | A1* | 4/2012 | Greenebaum | G09G 5/02 345/156 |
| 2012/0182276 | A1* | 7/2012 | Kee | G09G 5/10 345/207 |

(Continued)

FOREIGN PATENT DOCUMENTS

JP    H1032832    2/1998
JP    2002290826 A    10/2002

*Primary Examiner* — Antoinette Spinks
(74) *Attorney, Agent, or Firm* — Blank Rome LLP

(57) ABSTRACT

This disclosure relates to image capture devices with the ability to perform adaptive white balance correction using a switchable white reference (SWR). In some embodiments, the image capture device utilizes "true white" information to record images that better represent users' perceptions. In other embodiments, the same SWR and camera that dynamically sample ambient lighting conditions are used to determine "true white" in near real-time. In other embodiments, the image capture device comprises a display screen that utilizes the "true white" information in near real-time to dynamically adjust the display. In other embodiments, face detection techniques and/or ambient light sensors may be used to determine which device camera is most closely-aligned with the direction that the user of the device is currently looking in, and using it to capture a "true white" image in the direction that most closely corresponds to the ambient lighting conditions that currently dominate the user's perception.

20 Claims, 13 Drawing Sheets

(56) References Cited

U.S. PATENT DOCUMENTS

2014/0063049 A1\* 3/2014 Armstrong-Muntner G03B 9/00
 345/619
2016/0261792 A1\* 9/2016 Liu ........................ G03B 15/00

\* cited by examiner

IMAGE CAPTURE DEVICE WITH ADAPTIVE WHITE BALANCE CORRECTION USING A SWITCHABLE WHITE REFERENCE

BACKGROUND

This disclosure relates generally to the field of image capture, and more particularly, to image capture devices with the ability to perform adaptive white balance correction using a switchable white reference.

The advent of portable integrated computing devices has caused a widespread proliferation of cameras and video devices. These integrated computing devices commonly take the form of smartphones or tablets and typically include general purpose computers, cameras, sophisticated user interfaces including touch sensitive screens, and wireless communications abilities through Wi-Fi, LTE, HSDPA and other cell-based or wireless technologies. The widespread proliferation of these integrated devices provides opportunities to use the devices' capabilities to perform tasks that would otherwise require dedicated hardware and software. For example, as noted above, integrated devices such as smartphones and tablets typically have two or more embedded cameras. These cameras generally amount to lens/camera hardware modules that may be controlled through the general purpose computer using firmware and/or software (e.g., "Apps") and a user interface including the touch-screen fixed buttons and touchless control such as voice control.

The integration of cameras into communication devices such as smartphones and tablets has enabled people to share and view images and videos in ways never before possible. It is now very popular to acquire and immediately share photos with other people, either by sending the photos via text message, SMS, or email, or by uploading the photos to an Internet-based service, such as a social networking site or a photo sharing site.

Most portable integrated computing devices also incorporate at least one display screen to exchange information with users. Images may be captured by one or more cameras integrated with the device and displayed on the device's display screen, along with other content. During daily usage, users may experience numerous different ambient lighting conditions. The human eye and brain automatically adapt to the ambient lighting environment and process what is seen to be "color correct." However, electronic devices are still largely agnostic to ambient lighting condition changes, which can cause problems that users can perceive.

One common problem relates to the fact that white balance is partially taken care of by the camera when images are captured, but the correction process is not perfect, and recorded images can often be tinted. In such cases, the recorded image does not accurately represent what the user actually perceived at the moment the image was captured. Thus, an object may be perceived by the user as perfectly "white" at the moment of image capture, but recorded by the camera as cyan-tinted.

A second problem relates to the fact that, other than reflective displays that utilize natural ambient lighting as the light source, all electronic devices utilize some type of internal light source. As a result, the images displayed on screen are often rendered agnostic of the ambient lighting conditions. Thus, the device's screen may have a correct physical white point, i.e., the emitted spectrum is supposed to produce correct white, however, if the user has been adapted to the particular lighting conditions in the ambient environment, the colors on the device's screen may not appear to be rendered correctly to the user. For example, in an ambient environment that has red-deficient lighting conditions, the device's screen may appear particularly reddish to the user.

Many studies have been conducted attempting to determine methods to allow automatic white balancing on cameras and post-processing of the images. A typical white balancing algorithm involves determining which part of image is "true white" and adjusting the remainder of the image based on the determined "true white" portion of the image. Typical choices of "true white" may be a shiny highlight spot on an object caused by specular reflection or large areas of objects that are recorded by the image sensor as having a color that is close to white.

However, there are limitations on how much a camera can correct the white balance of an image based on the captured images. The white balance correction process relies on the objects in the image providing enough relevant color information for the software to find a "true white." Often, professional photographers shoot at a standard white reference first before taking photos of the targets in order to get an accurate white balance. As for the displays on consumer electronic devices, little has been done to satisfactorily correct the problem of adaptive white balance correction.

SUMMARY

Described herein are various methods, devices and computer readable media utilizing an image capture device with adaptive white balance correction capabilities. In particular, some embodiments described herein comprise an image capture device comprising one or more switchable white references (SWR) that enable the device's camera(s) to capture accurate "true white" images.

In other embodiments described herein, an image capture device is disclosed that utilizes the "true white" information to record images that better represent users' perceptions. In still other embodiments described herein, the same SWR and camera that dynamically sample ambient lighting conditions are used to determine "true white" in near real-time. In still other embodiments described herein, an image capture device comprises a display screen that utilizes the "true white" information in near real-time to dynamically adjust the image-on-screen.

In yet other embodiments, face detection techniques and/or ambient light sensors may be used to determine which device camera (e.g., in the case of devices with multiple cameras facing different directions) is most closely-aligned with direction that the user of the device is currently looking in, and using it to capture a "true white" image in order to capture a "true white" image in the direction that most closely corresponds to the ambient lighting conditions that are currently dominating the user's field of view/perception.

Further embodiments include methods and non-transitory program storage devices, readable by a programmable control device and comprising instructions stored thereon to cause one or more processing units to implement the functionality described herein.

DESCRIPTION

Systems, methods and program storage devices are disclosed, which provide instructions to cause one or more cameras and/or processing units to utilize a switchable white reference to perform improved white balance correction for images. The techniques disclosed herein are applicable to any number of electronic devices with cameras and displays, such as: digital cameras, digital video cameras, mobile phones, personal data assistants (PDAs), portable music players, monitors, as well as desktop, laptop, and tablet computer displays.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one implementation of the invention, and multiple references to "one embodiment" or "an embodiment" should not be understood as necessarily all referring to the same embodiment.

It will be appreciated that, in the development of any actual implementation (as in any development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design of an implementation of image processing systems having the benefit of this disclosure.

Figure 1:
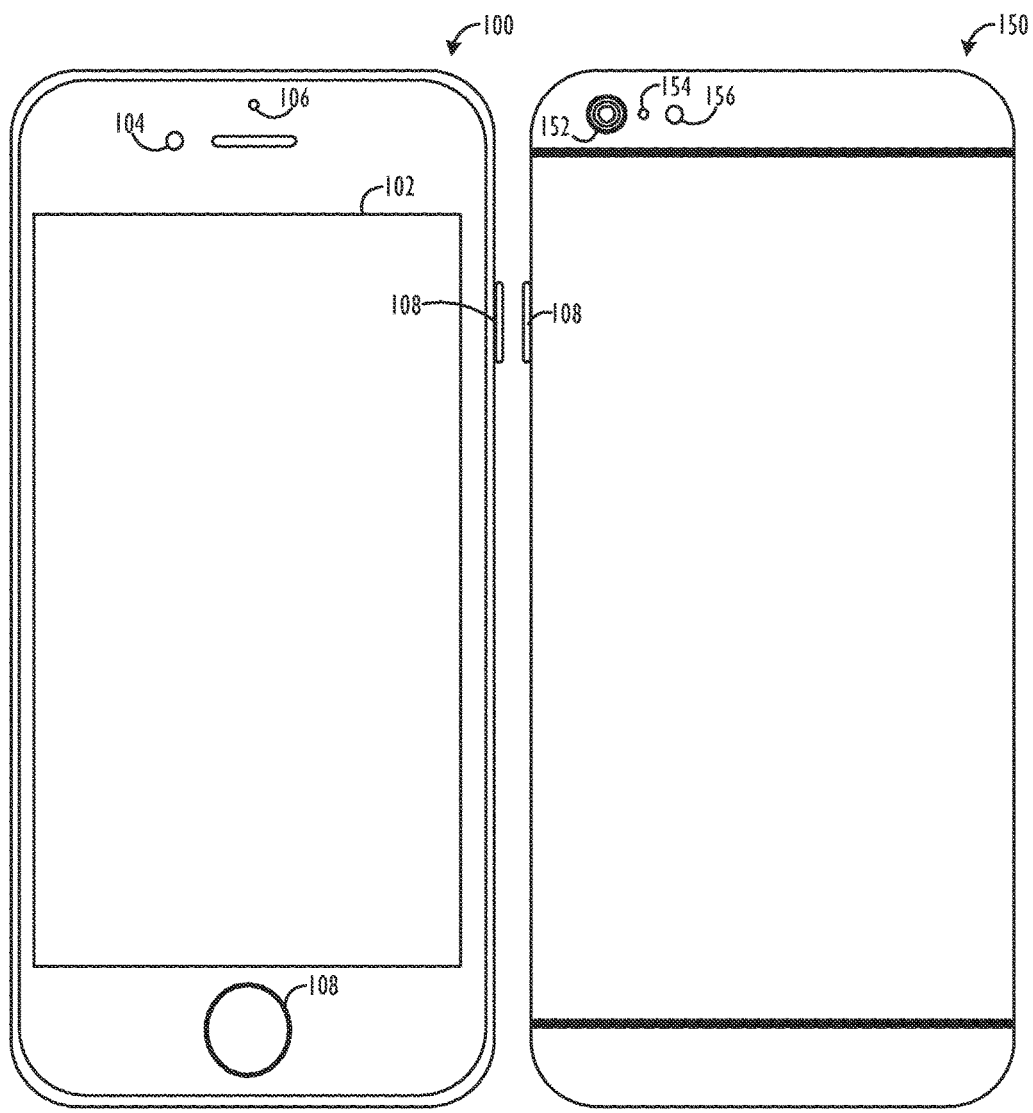
FIG. 1 illustrates an exemplary image capture device having a front-facing camera and a rear-facing camera, in accordance with one embodiment.

Referring now to FIG. 1, an exemplary image capture device 100 (front side)/150 (rear side) having a front-facing camera 104 and a rear-facing camera 152 is illustrated, in accordance with one embodiment. The exemplary image capture device 100/150 may also comprise other typical user interface-related features, such as a device display screen 102, one or more physical buttons 108, and a front-facing ambient light sensor 106. As mentioned above, the rear-side 150 of exemplary image capture device 100/150 may comprise a rear-facing camera 152, an ambient light sensor 154 and one or more flash elements 156 to aid in the process of image capture. In other embodiments, a greater number of cameras, sensors, flash elements, and/or cameras facing in additional directions may be included in the design of the image capture device.

Figure 2:
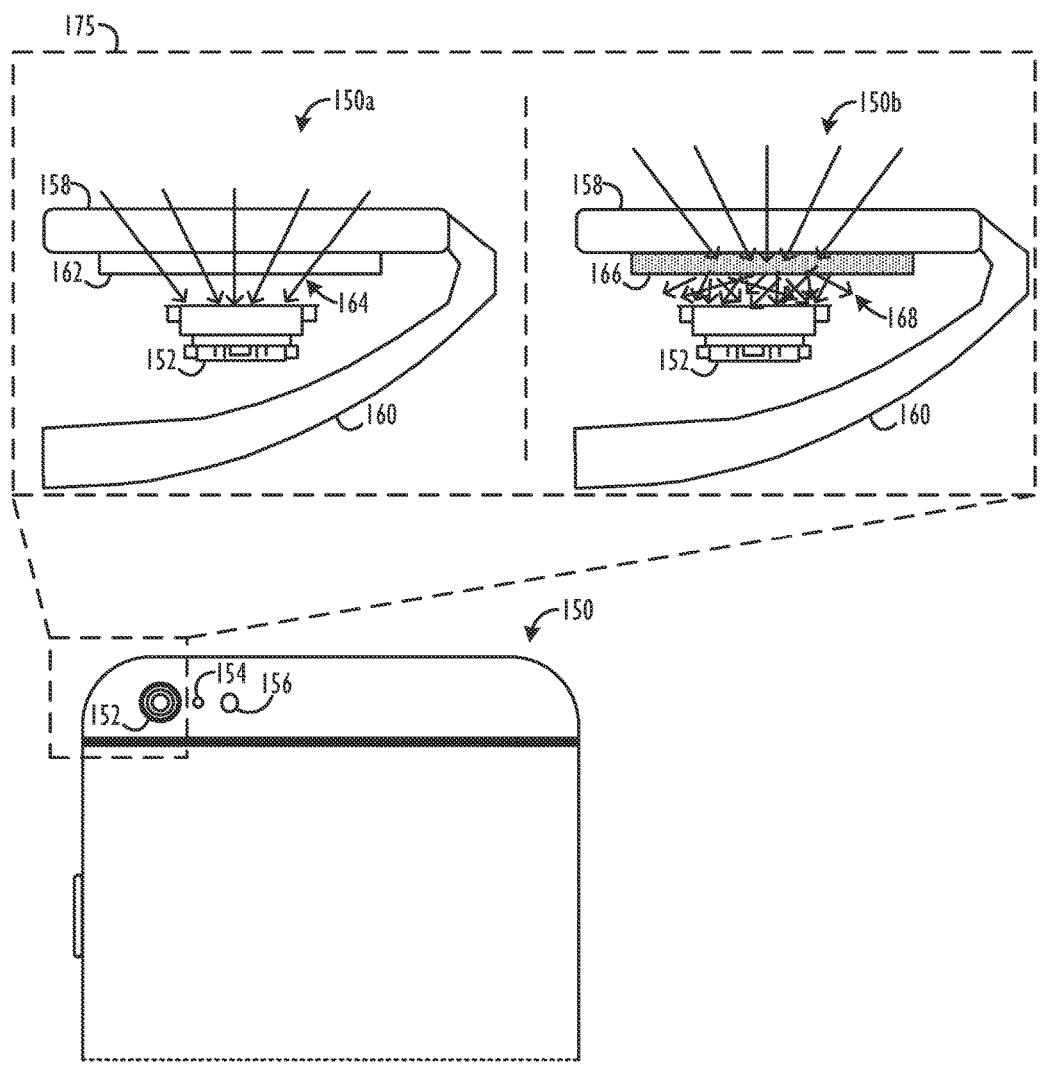
FIG. 2 illustrates an exemplary switchable white reference (SWR) design, in accordance with one embodiment.

Referring now to FIG. 2, an exemplary switchable white reference (SWR) design 162/166 is illustrated, in accordance with one embodiment. The dashed-line box 175 illustrates a magnified schematic view of the exemplary SWR design. As shown in FIG. 2, the rear-facing camera 152 of the device is mounted between an outer housing 160 and cover glass layer 158. The SWR 162/166 is shown as being mounted between the rear-facing camera 152 and cover glass layer 158.

The SWR 162/166 is a switchable device that may be configured to change between a "transparent mode" (150a) and a "diffusive white mode" (150b). In the transparent mode, the SWR 162 allows incident light rays 164 to pass through without scattering. In the diffusive white mode, the SWR 166 generates strong scattering of the incident light rays 168, which then serve as the reference or "true white" color recorded by the image sensor of camera 152. The SWR 162/166 may be placed directly in front of the camera 152 or to the side, where an optical path may be made for light rays to be diffused by the SWR before getting into the camera. In some embodiments the SWR 162/166 may actually be integrated into the cover glass layer 158 in order to provide a wider aperture and collect incident light rays from a wider angle. In still other embodiments, the SWR 162/166 may be physically rotated or swung into and out of position in front of the camera 152 by electromechanical elements, such as gear(s), motor(s), magnet(s), hinge(s), etc.

There are many possible mechanisms by which the SWR may be implemented, several of which will now be discussed in further detail below with reference to FIGS. 3A-3C.

Figure 3A:
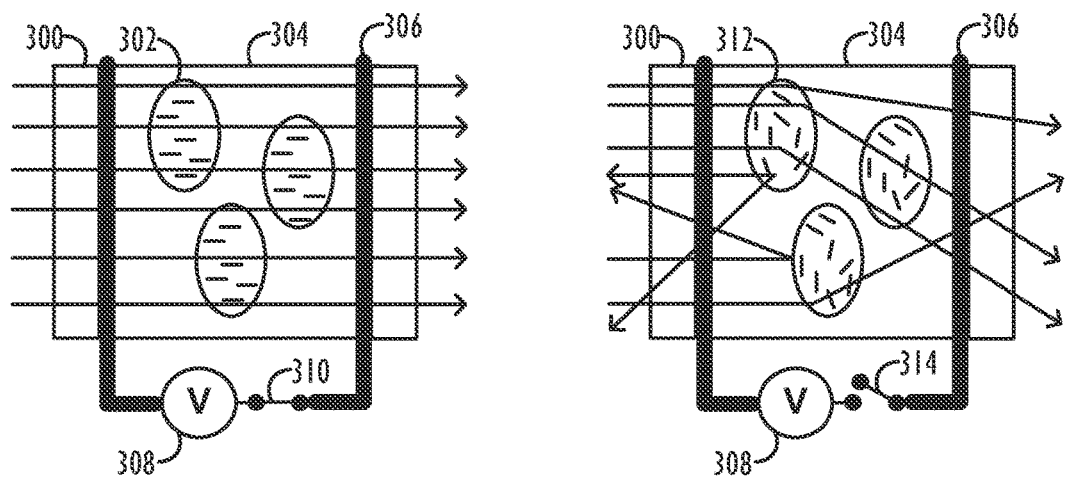
FIG. 3A illustrates an exemplary switchable white reference comprising a polymer-dispersed liquid crystal display (PDLC), in accordance with one embodiment.

Referring first to FIG. 3A, an exemplary switchable white reference comprising a polymer-dispersed liquid crystal display (PDLC) is illustrated, in accordance with one embodiment. The PDLC may comprises of PET film (300), and a polymer filler material (304) surrounded by a conductive coating (306). When the power from voltage source 308 is turned on (as shown with the switch in position 310), the liquid crystal molecules (302) become arranged in a regular manner, allowing light to pass through uninterrupted, i.e., the "transparent mode." By contrast, when the power from voltage source 308 is turned off (as shown with the switch in position 314), the liquid crystal molecules (312) become arranged in an irregular manner, thus dispersing the incident light rays, i.e., the "diffusive white mode."

Figure 3B:
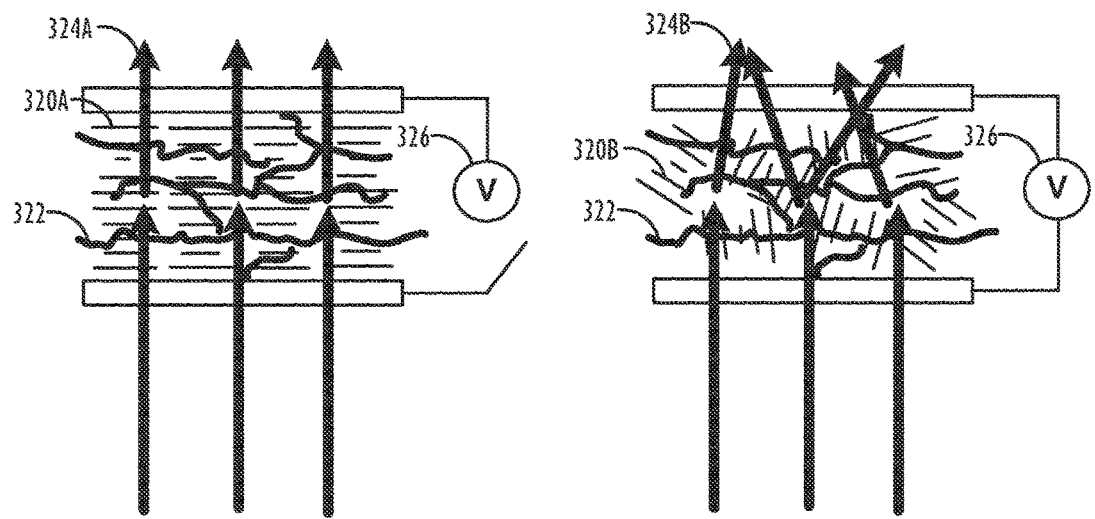
FIG. 3B illustrates an exemplary switchable white reference comprising a reverse mode polymer stabilized cholesteric texture (PSCT), in accordance with one embodiment.

Referring now to FIG. 3B, an exemplary switchable white reference comprising a reverse mode polymer stabilized cholesteric texture (PSCT) is illustrated, in accordance with one embodiment. In the PSCT example shown in FIG. 3B, when voltage source 326 is powered off, incident light rays 324*a* are transmitted through the liquid crystals 320*a* and polymer network 322 uninterrupted, i.e., the "transparent mode" referred to above. By contrast, when voltage source 326 is powered on, incident light rays 324*b* are scattered during transmission through the liquid crystals 320*a* and polymer network 322, i.e., the "diffusive white mode" referred to above.

Figure 3C:
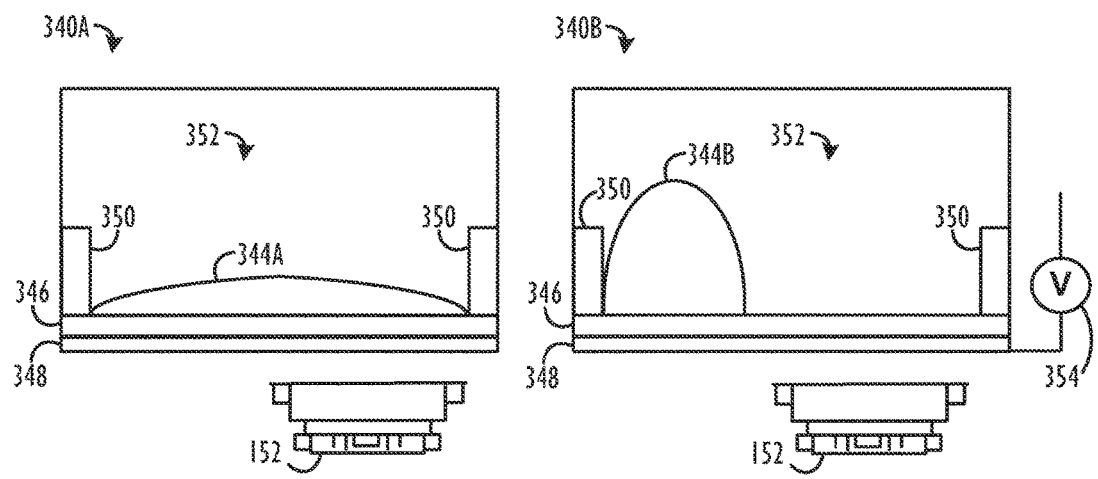
FIG. 3C illustrates an exemplary switchable white reference comprising an electro-wetting display, in accordance with one embodiment.

Referring now to FIG. 3C, an exemplary switchable white reference comprising an electro-wetting display is illustrated, in accordance with one embodiment. Electro-wetting, or "electrophoretic" display technology works by utilizing electricity to cause liquids that are blended with white particles that are designed to scatter incident light to migrate, due to wetting properties changes of the commanding surface 346. As shown in FIG. 3C, "white mode" (340*a*) comprises a transparent liquid 352, a white liquid 344*a* trapped between two cell walls 350, a commanding surface 346, and a transparent electrode 348. In the "white mode" configuration, the white liquid 344*a* covers the aperture of camera 152, causing it to capture a "true white" image. By contrast, "transparent mode" (340*b*) comprises a voltage source 354 that is powered on to cause the white liquid 344*b* to migrate along the commanding surface 346 towards one of the cell walls 350, such that the white liquid 344*b* no longer covers the aperture of camera 152, causing it to capture a non-scattered, i.e., non-white, image.

Figure 4A:
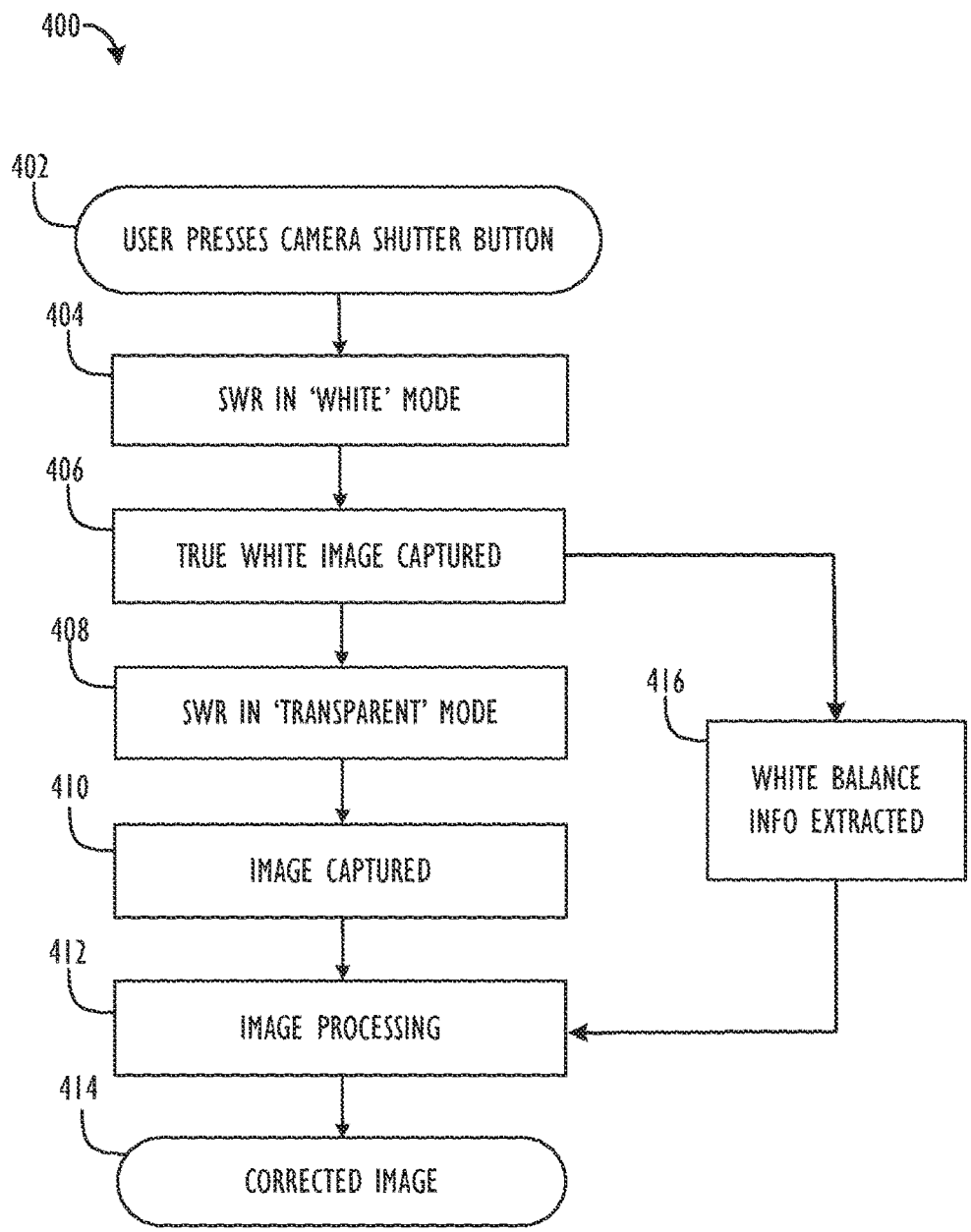
FIG. 4A illustrates an exemplary process for utilizing an SWR to perform white balancing in flowchart form, in accordance with one embodiment.

Referring now to FIG. 4A, an exemplary process 400 for utilizing an SWR to perform white balancing is illustrated in flowchart form, in accordance with one embodiment. As will be explained in greater detail below, in process 400, the "true white" image is taken before the "real" image that the user wishes to capture. First, the user depresses the camera's "shutter button" (or equivalent user interface element) to indicate the desire to capture an image using the camera (Step 402). Next, the SWR is configured to be in the "diffusive white mode" (Step 404). At that point, a "true white" image may be captured (Step 406), from which near real-time white balance information may be extracted (Step 416). Next, the SWR is configured to be in the "transparent mode" (Step 408), so that a normal image may be captured (Step 410). The captured image may then be processed at Step 412 with the added benefit of the white balance information from Step 416, resulting in a corrected image 414, which may be stored in memory and/or presented to the user, e.g., via the device's display.

Figure 4B:
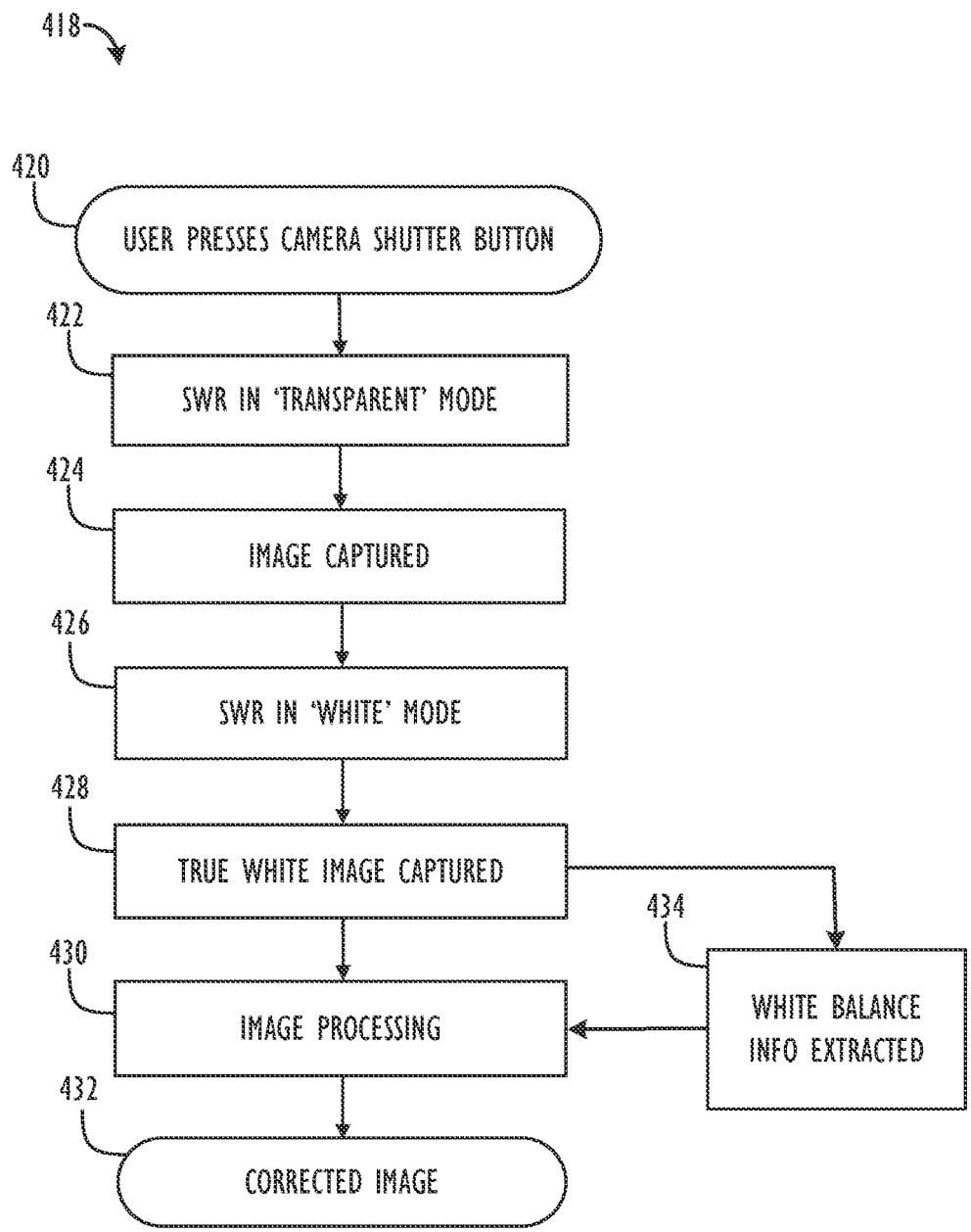
FIG. 4B illustrates another exemplary process for utilizing an SWR to perform white balancing in flowchart form, in accordance with one embodiment.

Referring now to FIG. 4B, an exemplary process 418 for utilizing an SWR to perform white balancing is illustrated in flowchart form, in accordance with one embodiment. In process 418, the "true white" image is taken after the "real" image that the user wishes to capture. First, the user depresses the camera's "shutter button" (or equivalent user interface element) to indicate the desire to capture an image using the camera (Step 420). Next, the SWR is configured to be in the "transparent mode" (Step 422). At that point, the normal image is captured (Step 424). Next, the SWR is configured to be in the "diffusive white mode" (Step 426) so that a "true white" image may be captured (Step 428), from which near real-time white balance information may be extracted (Step 434). The captured image may then be processed at Step 430 with the added benefit of the white balance information from Step 434, resulting in a corrected image 432, which may be stored in memory and/or presented to the user, e.g., via the device's display.

Figure 4C:
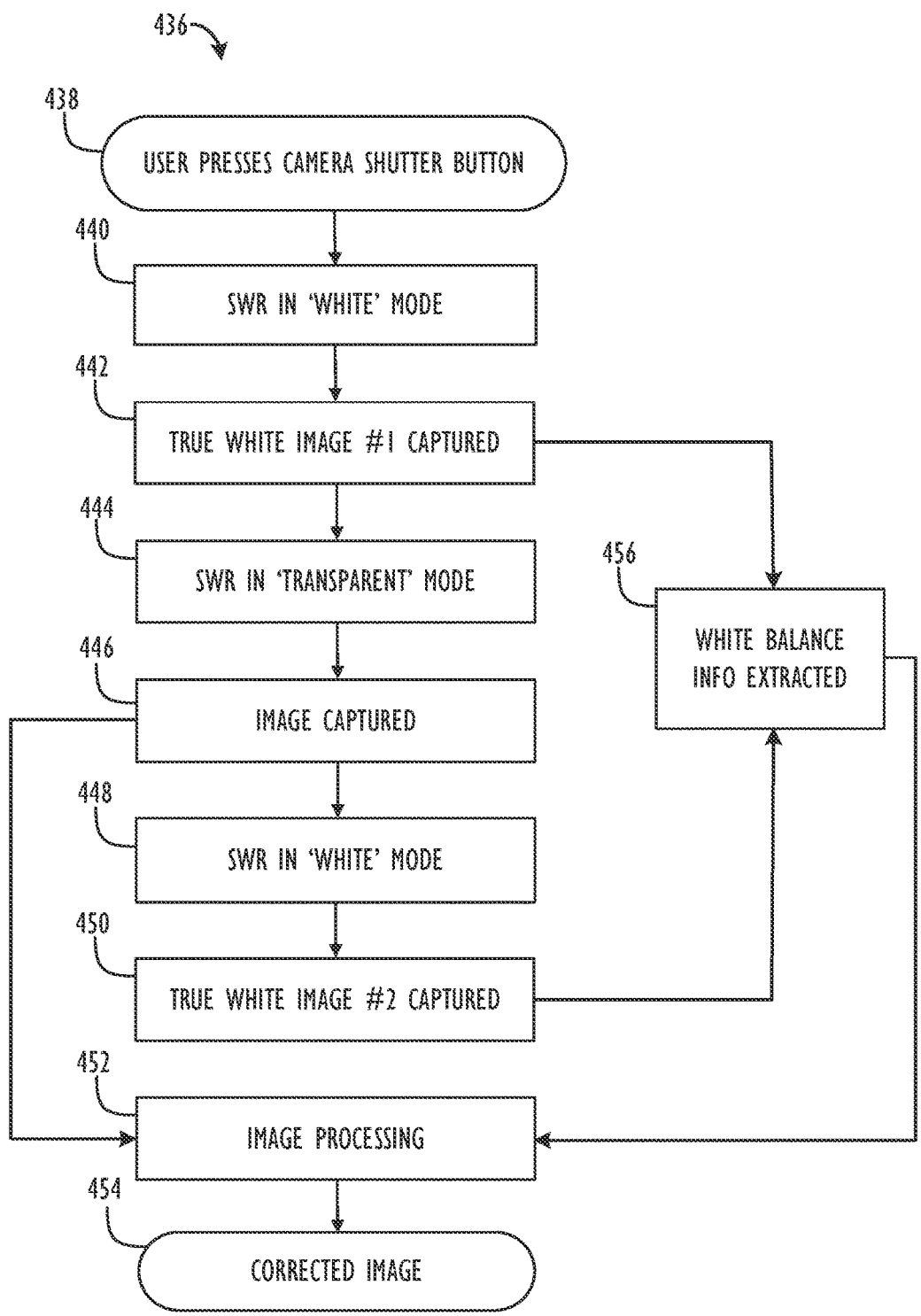
FIG. 4C illustrates yet another exemplary process for utilizing an SWR to perform white balancing in flowchart form, in accordance with one embodiment.

Referring now to FIG. 4C, an exemplary process 436 for utilizing an SWR to perform white balancing is illustrated in flowchart form, in accordance with one embodiment. In process 436, a "true white" image is taken both before and after the "real" image that the user wishes to capture. First, the user depresses the camera's "shutter button" (or equivalent user interface element) to indicate the desire to capture an image using the camera (Step 438). Next, the SWR is configured to be in the "diffusive white mode" (Step 440). At that point, the "before" "true white" image may be captured (Step 442), from which near real-time white balance information may be extracted (Step 456). Next, the SWR is configured to be in the "transparent mode" (Step 444). At that point, the normal image is captured (Step 446). Next, the SWR is again configured to be in the "diffusive white mode" (Step 448) so that the "after" "true white" image may be captured (Step 450), from which additional near real-time white balance information may be extracted (Step 456). The captured image may then be processed at Step 452 with the added benefit of both the "before" and the "after" white balance information from Step 456, resulting in a corrected image 454, which may be stored in memory and/or presented to the user, e.g., via the device's display. Various techniques may be employed to combine the white balance information taken from both the "before" and "after" "true white" images. For example, the "before" and "after" images may be averaged, interpolated, or combined in some other fashion to produce a weighted average, e.g., giving greater weight to the "true white" image with a higher average brightness value or giving greater weight to the "true white" image that was taken closer in time to the "real" image captured by the user.

Figure 5:
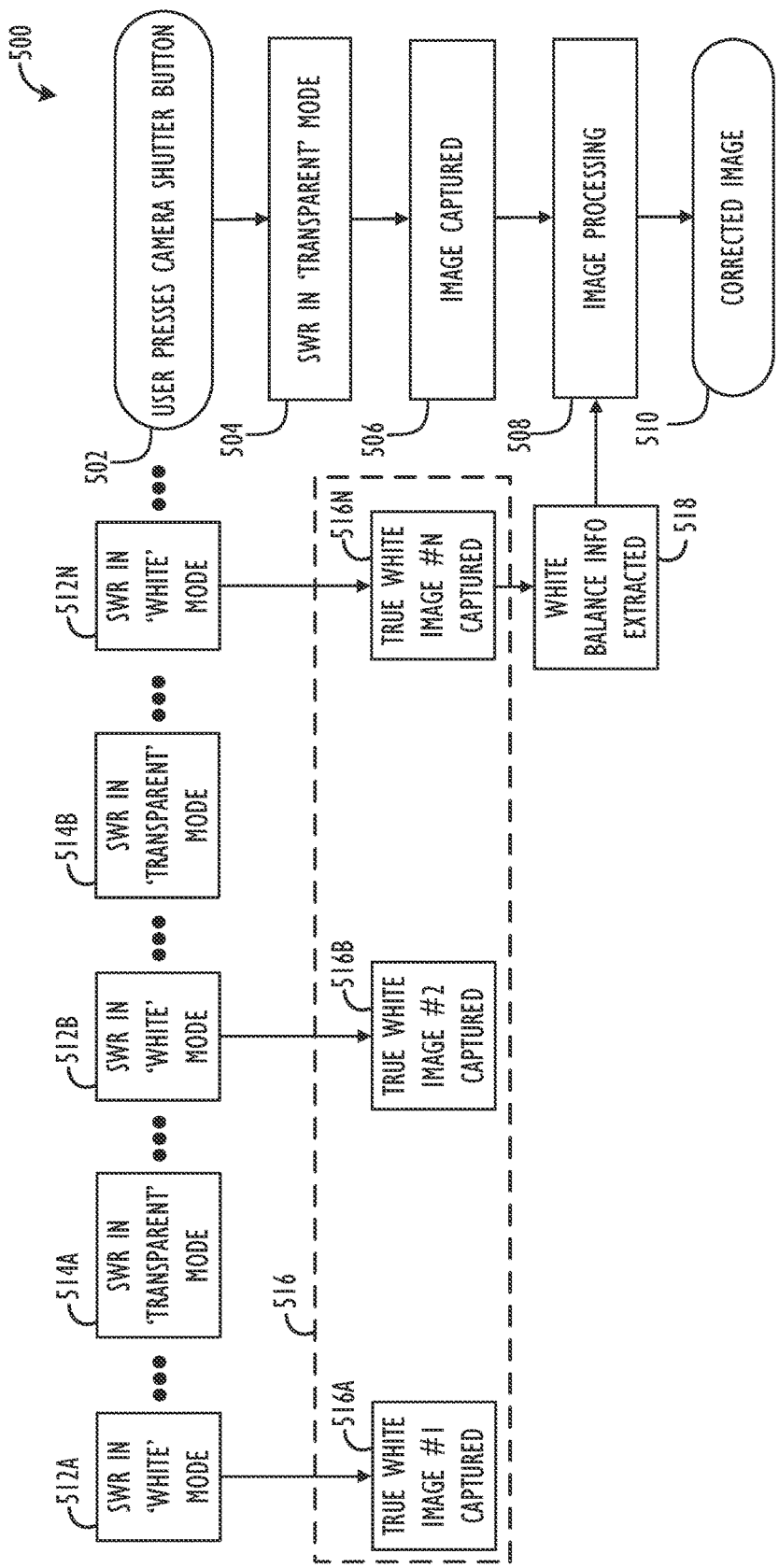
FIG. 5 illustrates yet another exemplary process for utilizing an SWR to perform white balancing in flowchart form, in accordance with one embodiment.

Referring now to FIG. 5, an exemplary process 500 for utilizing an SWR to perform white balancing is illustrated in flowchart form, in accordance with one embodiment. According to process 500, the SWR automatically switches between a "diffusive white mode" (512*a*/512*b*/512*n* . . . ) and a "transparent white" mode (514*a*/514*b*/514*n* . . . ) once a user enters a "camera" mode or application on the device. A series 516 of "true white" reference images (516*a*/516*b*/516*n* . . . ) may thus be recorded before and/or after the "real" image captured by the user. The process for capturing the "real" image is similar to that described in FIGS. 4A-4C: the user depresses the camera's "shutter button" (or equivalent user interface element) to indicate the desire to capture an image using the camera (Step 502); the SWR is configured to be in the "transparent mode" (Step 504); the "real" image is captured (Step 506); and the captured image may then be processed at Step 508 with the added benefit of the white balance information from Step 518, resulting in a corrected image 510, which may be stored in memory and/or presented to the user, e.g., via the device's display.

The device may use all the white balance information gathered from the series 516 of "true white" reference images (516*a*/516*b*/516*n* . . . ) to intelligently figure out the best white balance gains for all of the reference white images, resulting in extracted white balance information 518. This technique may be particularly useful if the response time of the SWR is not fast enough to avoid any noticeable delay in taking a photo using the previously described processes.

The process illustrated in FIG. 5 may be extended further and employed even when users are not intending to take a photo. For example, the device camera(s) and SWR can be turned on from time to time, e.g., at predetermined time intervals, in order to capture a series of true white reference images. The information collected from the true white reference images may then be used by the device to determine what kind of ambient light conditions the device is in. This information may then be used to adjust the white balance of the content displayed on the device's display screen. In addition, this information may provide additional information to the device's ambient light sensor(s) with regard to the overall brightness of the environment. The information may also be used to adjust display brightness and other settings accordingly, based on the ambient lighting conditions gleaned from the reference white images.

By employing the above-described techniques, the images recorded by the camera should better represent user's perception. However, when the recorded content and/or other system-generated content is displayed on the device's display screen, the user of the device could be in totally different lighting conditions to which he or she is already well-adapted. Ideally, the emitted display white point should be "color correct" (e.g., for a D65 light source) regardless of ambient lighting conditions. However, when the user looks at the same displayed content under fluorescent lighting conditions and incandescent lighting conditions, the content's appearance could look totally different due to the chromatic adaption to the particular ambient lighting conditions. As a result, displayed content should be modified, e.g., via a chromatic adaptation transformation, to recreate the correct perception, i.e., the user's perception at the time when the content was generated.

Figure 6:
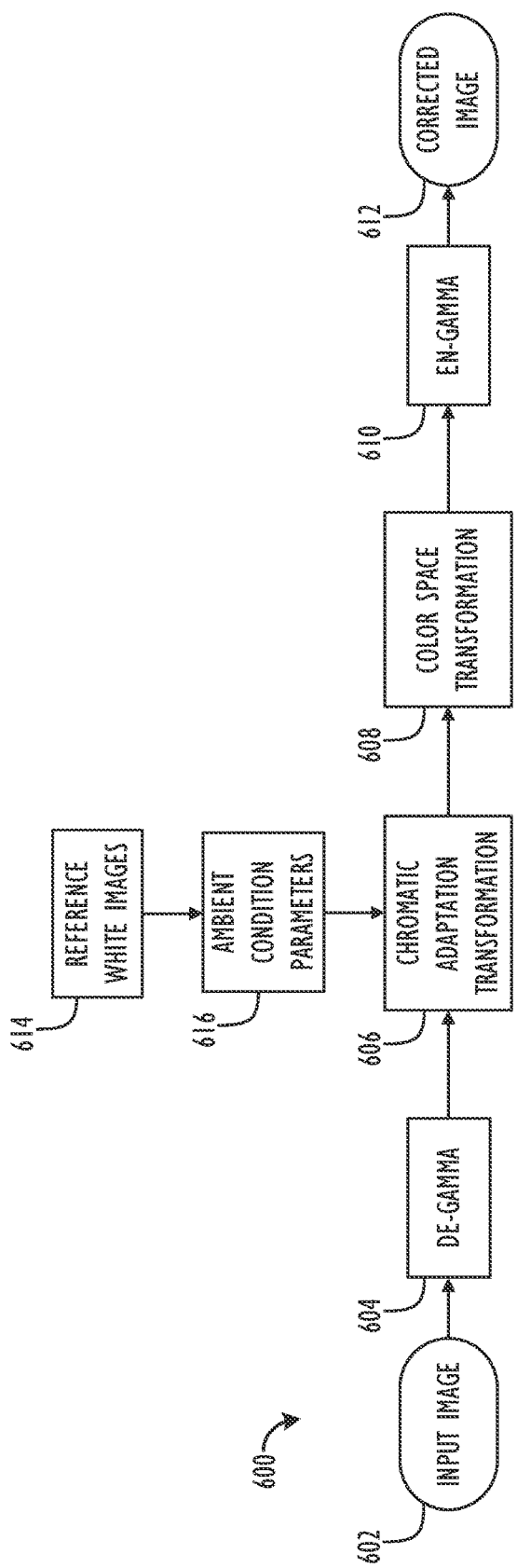
FIG. 6 illustrates an exemplary process for performing chromatic adaptation transformation in flowchart form, in accordance with one embodiment.

Referring now to FIG. 6, an exemplary process 600 for performing such a chromatic adaptation transformation is illustrated in flowchart form, in accordance with one embodiment. First, a series of "true white" reference images may be captured (Step 614), as described above with reference to Step 516 of FIG. 5. Next, ambient condition parameters including, e.g., ambient light correlated color temperature (CCT) and light intensity, will be directly extracted by analyzing the reference white images (Step 616). In the meantime, the original input image 602 may go through a de-gamma block (Step 604) to convert from the digital count domain to luminance domain (e.g., CIEXYZ). Next, a chromatic adaptation transformation (CAT) may be applied, taking into account the ambient condition parameters to predict the corresponding colors under the current ambient conditions (Step 606). The CAT may then be followed by an inverse color space transformation (Step 608). The image data may then be converted back to the RGB linear domain, and finally be en-gammed (Step 610) to re-generate the corrected image (Step 612) so that the colors in the image will look "perceptually correct."

One exemplary CAT is the CIE Chromatic Adaptation Transformation 02 (CIECAT02). Given a set of tristimulus values in XYZ, the corresponding RGB value in LMS space is calculated by $M_{CAT02}$ to prepare for adaptation, as shown in Eqns. 1 and 2 below:

$$\begin{bmatrix} R \\ G \\ B \end{bmatrix} = M_{CAT02} \begin{bmatrix} X \\ Y \\ Z \end{bmatrix} \quad \text{(Eqn. 1)}$$

$$M_{CAT02} = \begin{bmatrix} 0.7328 & 0.4296 & -0.1624 \\ -0.7036 & 1.6975 & 0.0061 \\ 0.0030 & 0.0136 & 0.9834 \end{bmatrix} \quad \text{(Eqn. 2)}$$

The D factor of degree of adaptation, see Eqn. 3 below, is a function of the surround (F=1, average, F=0.9, Dim, F=0.8, Dark), and $L_A$ is the adapting field luminance in cd/m². D can be set to zero for no adaptation and unity for complete adaptation.

$$D = F\left[1 - \left(\frac{1}{3.6}\right)e^{\left(\frac{-L_A - 42}{92}\right)}\right] \quad \text{(Eqn. 3)}$$

Given the D factor, and data transformed using $M_{CAT02}$, the full chromatic adaptation transform can be written as shown in Eqn. 4 below, where the w subscript denotes the corresponding value for reference white point and the c subscript denotes stimuli values. $G_c$ (green) and $B_c$ (blue) adapted values may be calculated in a similar manner.

$$R_c = [(Y_w \cdot D/R_w) + (1-D)]R \quad \text{(Eqn. 4)}$$

Finally, the corresponding color can be calculated by multiplying the inverse chromatic adaptation transformation matrix to go back to the CIEXYZ domain, as shown in Eqn. 5 below.

$$\begin{bmatrix} X \\ Y \\ Z \end{bmatrix} = M_{CAT02}^{-1} \begin{bmatrix} R_C \\ G_C \\ B_C \end{bmatrix} \quad \text{(Eqn. 5)}$$

Referring now to FIGS. 7A-7D, exemplary scenarios in which a multi-camera device with an SWR and face detection capabilities may be utilized to employ improved white balancing techniques are illustrated, in accordance with some embodiments.

Figure 7A:
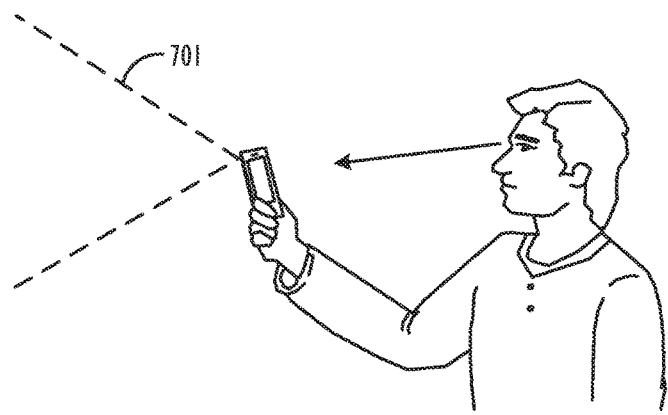
FIGS. 7A-7D illustrate exemplary scenarios in which a multi-camera device with an SWR and face detection capabilities may be utilized to employ improved white balancing techniques, in accordance with some embodiments.

In FIG. 7A, the user is looking at the device display on the front of the device, and the rear-facing side of the device is facing away from the user. In some such embodiments, the device may determine the direction of the user's gaze by running a face detection/face recognition algorithm using the front-facing camera and/or a rear-facing camera. If the user of the device's face is detected looking at the front-facing camera of the device, the device may determine that the device's rear-facing camera should be used to capture the reference "true white" images for the white balance correction process (represented by dashed lines 701), since the rear-facing camera is most closely aligned with the direction that the user is currently looking in, and thus the ambient lighting conditions that are likely to be dominating the users' current environment. Conversely, if the user of the device's face is detected looking at the rear-facing camera of the device, the device may determine that the device's front-facing camera should be used to capture the reference "true white" images for the white balance correction process.

Figure 7B:
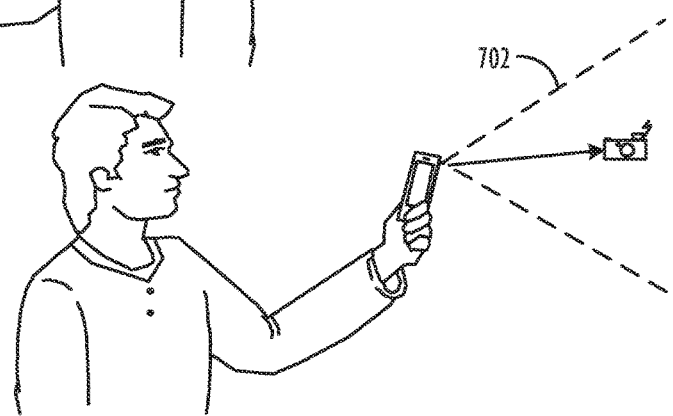

In FIG. 7B, the user is looking at the device display on the front of the device and using the rear-facing camera of the device to take a picture in the direction that the user is looking. In some such embodiments, when the device is in such a 'camera' mode using the device's rear-facing camera, the device may determine that the device's rear-facing camera should be used to capture the reference "true white"

images for the white balance correction process (represented by dashed lines 702), since the rear-facing camera is most closely aligned with the direction in which the user is currently attempting to capture an image, and thus the ambient lighting conditions that are likely to dominate the image that the user is about to capture.

Figure 7C:
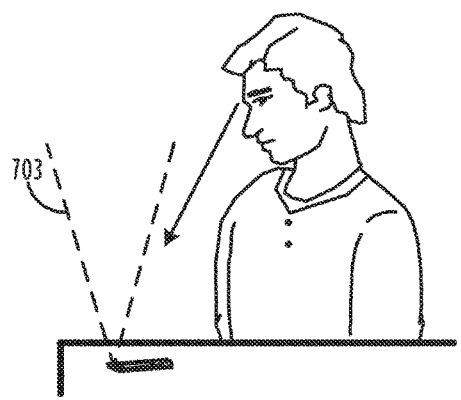

In FIG. 7C, the user is looking at the device display on the front of the device while the device is laying on a flat surface. In some such embodiments, the device may determine that the device's rear-facing camera is blocked and/or otherwise reading a very low ambient light level and thus should not be used to capture the reference "true white" images for the white balance correction process, instead using the device's front-facing camera (represented by dashed lines 703). In other embodiments, if the device is not in a 'camera' mode and no user face is detected, the device may utilize whichever device camera is reading a higher ambient light level to capture the reference "true white" images.

Figure 7D:
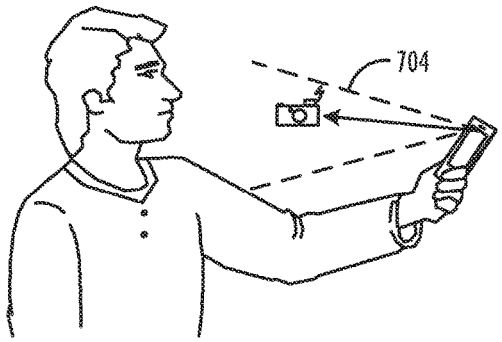

In FIG. 7D, the user is looking at the device display on the front of the device and using the front-facing camera of the device to take a self-portrait or "selfie" picture of himself. In some such embodiments, when the device is in such a 'camera' mode using the device's front-facing camera, the device may determine that the device's front-facing camera should be used to capture the reference "true white" images for the white balance correction process (represented by dashed lines 704), since the front-facing camera is most closely aligned with the direction in which the user is currently attempting to capture an image, and thus the ambient lighting conditions that are likely to dominate the image that the user is about to capture.

Figure 7E:
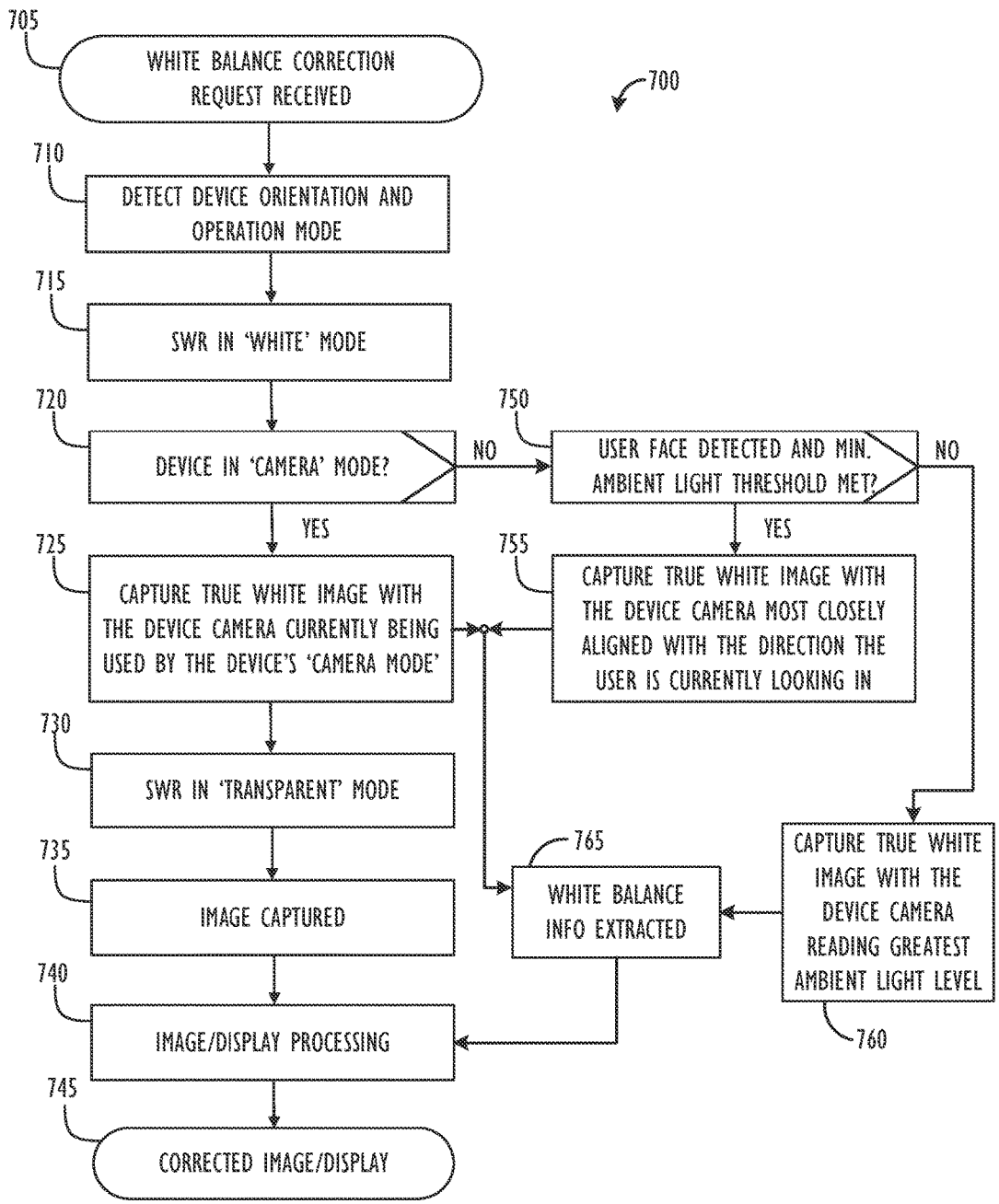
FIG. 7E illustrates an exemplary process for utilizing an SWR and face detection with a multi-camera device to perform white balancing in flowchart form, in accordance with one embodiment.

Referring now to FIG. 7E, an exemplary process 700 for utilizing an SWR and face detection with a multi-camera device to perform white balancing is illustrated in flowchart form, in accordance with one embodiment. First, a white balance correction request is received at the device (Step 705). This request could come either from the user pressing the camera shutter button (as described above with reference to FIGS. 4A-4C), or merely from a predetermined amount of time passing, e.g., if the device is periodically sampling the white level of the device's ambient environment (as described above with reference to FIG. 5).

At that point, the device can detect the device orientation (e.g., in which directions are each of the device's cameras facing) using internal sensors, such as gyrometers and/or accelerometers (Step 710). The device can also detect what type of operational mode the device is in, e.g., a 'camera mode,' such as front-facing camera mode or rear-facing camera mode, display mode, eBook reading mode, etc. (Step 710). When this information has been ascertained, the SWR may be configured to be in the "diffusive white mode" (Step 715). Next, if the device is in 'camera mode' (Step 720), the process may proceed to: capture the "true white" image with the device camera that is currently being utilized by the device's 'camera mode' (Step 725); extract the relevant white balance information (Step 765); configure the SWR to be in "transparent mode" (Step 730); capture the "real" image (Step 735); and then perform image processing (Step 740) with the added benefit of the white balance information from Step 765, resulting in a corrected image (Step 745).

If, instead, at Step 720, the device determines that it is not in 'camera' mode, it may execute a face detection/face recognition algorithm using the front-facing camera and/or rear-facing camera. If a face is detected, the device may then use whichever of the device's cameras is more closely aligned with the direction the user is currently looking in (assuming that the device camera most closely aligned with the direction the user is currently looking in is also reading greater than a minimum threshold ambient light level) (Step 750) to capture the reference "true white" images for the white balance correction process (Step 755), from which the relevant white balance information may be extracted (Step 765). The process may then proceed to perform image processing (Step 740) on the display of the device with the added benefit of the white balance information from Step 765, resulting in a corrected device display (Step 745). The reason for the minimum threshold ambient light level requirement is for situations such as that shown in FIG. 7C, wherein the camera most closely aligned with the direction the user's face is currently looking in may be against a flat surface, and thus provide little or no meaningful ambient light level information.

If, instead, at Step 750, a face is not detected or the threshold ambient light level is not met by the relevant device camera, the device may then use whichever of the device's cameras is reading a greater ambient light level to capture the reference "true white" images for the white balance correction process (Step 760), from which the relevant white balance information may be extracted (Step 765). The process may then proceed to perform image processing (Step 740) on the display of the device with the added benefit of the white balance information from Step 765, resulting in a corrected device display (Step 745).

Figure 8:
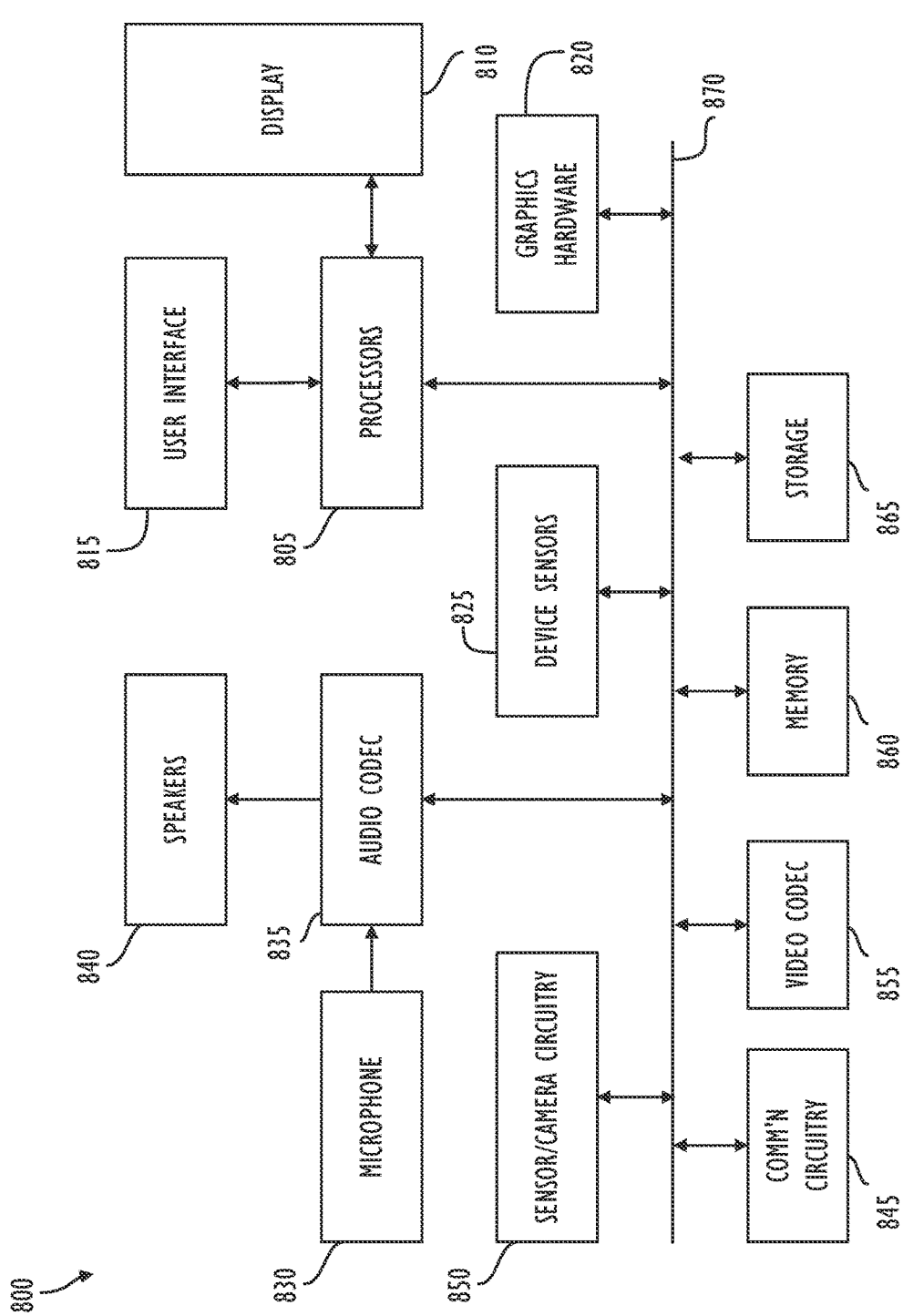
FIG. 8 illustrates a simplified functional block diagram of an illustrative electronic image capture and display device, according to one embodiment.

FIG. 8 is a simplified functional block diagram of an illustrative electronic device for image capture and display, according to one embodiment. Electronic device 800 may include processor 805, display 810, user interface 815, graphics hardware 820, device sensors 825 (e.g., proximity sensor/ambient light sensor, accelerometer and/or gyroscope), microphone 830, audio codec(s) 835, speaker(s) 840, communications circuitry 845, digital image capture unit 850, video codec(s) 855, memory 860, storage 865, and communications bus 870. Electronic device 800 may be, for example, a personal digital assistant (PDA), personal music player, a mobile telephone, or a notebook, laptop or tablet computer system.

Processor 805 may execute instructions necessary to carry out or control the operation of many functions performed by device 800. Processor 805 may, for instance, drive display 810 and receive user input from user interface 815. User interface 815 can take a variety of forms, such as a button, keypad, dial, a click wheel, keyboard, display screen and/or a touch screen. Processor 805 may be a system-on-chip such as those found in mobile devices and include a dedicated graphics processing unit (GPU). Processor 805 may be based on reduced instruction-set computer (RISC) or complex instruction-set computer (CISC) architectures or any other suitable architecture and may include one or more processing cores. Graphics hardware 820 may be special purpose computational hardware for processing graphics and/or assisting processor 805 process graphics information. In one embodiment, graphics hardware 820 may include a programmable graphics processing unit (GPU).

Sensor and camera circuitry 850 may capture still and video images that may be processed to generate images in accordance with this disclosure. Output from camera circuitry 850 may be processed, at least in part, by video codec(s) 855 and/or processor 805 and/or graphics hardware 820, and/or a dedicated image processing unit incorporated within circuitry 850. Images so captured may be stored in memory 860 and/or storage 865. Memory 860 may include one or more different types of media used by processor 805, graphics hardware 820, and image capture circuitry 850 to perform device functions. For example, memory 860 may include memory cache, read-only memory (ROM), and/or random access memory (RAM). Storage 865 may store media (e.g., audio, image and video files), computer program instructions or software, preference information, device profile information, and any other suitable data. Storage 865 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 860 and storage 865 may be used to retain computer program instructions or code organized into one or more modules and written in any desired computer programming language. When executed by, for example, processor 805 such computer program code may implement one or more of the methods described herein.

It is to be understood that the above description is intended to be illustrative, and not restrictive. The material has been presented to enable any person skilled in the art to make and use the invention as claimed and is provided in the context of particular embodiments, variations of which will be readily apparent to those skilled in the art (e.g., some of the disclosed embodiments may be used in combination with each other). In addition, it will be understood that some of the operations identified herein may be performed in different orders. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. An apparatus, comprising:
   two or more cameras, each camera comprising an image sensor and a switchable white reference element configured to switch between a first transparent mode and a second diffusive mode;
   a display;
   a memory having, stored therein, computer program code; and
   one or more processing units operatively coupled to the memory and configured to execute instructions in the computer program code that cause the one or more processing units to:
   determine a first operational mode of the apparatus; and
   if the first operational mode is not determined to be a camera mode—
      attempt to detect a face of a user of the apparatus using one or more of the two or more cameras; and
      if the face of a user of the apparatus is detected and if the camera most closely aligned with a direction that the detected user's face is currently looking in is reading greater than a minimum threshold ambient light level—
         configure the switchable white reference element of the apparatus camera most closely aligned with a direction that the detected user's face is looking in into the second diffusive mode;
         capture a first reference white image using the apparatus camera most closely aligned with a direction that the detected user's face is looking in;
         determine a first white point for the first reference white image; and
         adjust a color composition of the display based, at least in part, on the determined first white point for the first reference white image.

2. The apparatus of claim 1, wherein the first transparent mode of a respective camera of the two or more cameras comprises a mode wherein light passes through the respective camera's switchable white reference element to the respective camera's respective image sensor without scattering.

3. The apparatus of claim 1, wherein the second diffusive mode of a respective camera of the two or more cameras comprises a mode wherein light passes through the respective camera's switchable white reference element to the respective camera's respective image sensor with scattering.

4. The apparatus of claim 1, wherein the one or more processing units are further configured to execute instructions in the computer program code that cause the one or more processing units to determine the first operational mode of the apparatus at predetermined time intervals.

5. The apparatus of claim 1, wherein the switchable white reference element of at least one of the two or more cameras comprises at least one of the following: a polymer-dispersed liquid crystal display (PDLC), a reverse mode polymer stabilized cholesteric texture (PSCT), and an electro-wetting display.

6. The apparatus of claim 1, wherein the instructions in the computer program code further cause the one or more processing units to:
   if the first operational mode is determined to be a camera mode—
      configure the switchable white reference element of the apparatus camera being utilized in the camera mode into the second diffusive mode;
      capture a second reference white image using the apparatus camera being utilized in the camera mode;
      determine a second white point for the second reference white image;
      configure the switchable white reference element of the apparatus camera being utilized in the camera mode into the first transparent mode;
      obtain a first captured image from the image sensor of the apparatus camera being utilized in the camera mode; and
      adjust a color composition of the first captured image based, at least in part, on the second determined white point for the second reference white image.

7. The apparatus of claim 6, wherein the instructions in the computer program code further cause the one or more processing units to:
   if the first operational mode is not determined to be a camera mode, and the face of a user of the apparatus is detected, and if the camera most closely aligned with a direction that the detected user's face is currently looking in is not reading greater than a minimum threshold ambient light level, or
   if the first operational mode is not determined to be a camera mode, and no face of a user of the apparatus is detected—
      configure the switchable white reference element of the apparatus camera reading the greatest ambient light level into the second diffusive mode;
      capture a third reference white image using the apparatus camera reading the greatest ambient light level;
      determine a third white point for the third reference white image; and adjust a color composition of the display based, at least in part, on the third determined white point for the third reference white image.

8. A non-transitory program storage device, readable by a programmable control device and comprising instructions stored thereon to cause one or more processing units to:
 determine a first operational mode of an apparatus, the apparatus comprising:
  two or more cameras, each camera comprising an image sensor and a switchable white reference element configured to switch between a first transparent mode and a second diffusive mode; and
  a display; and
 if the first operational mode is not determined to be a camera mode—
  attempt to detect a face of a user of the apparatus using one or more of the two or more cameras; and
  if the face of a user of the apparatus is detected and if the camera most closely aligned with a direction that the detected user's face is currently looking in is reading greater than a minimum threshold ambient light level—
   configure the switchable white reference element of the apparatus camera most closely aligned with a direction that the detected user's face is looking in into the second diffusive mode;
   cause the apparatus to capture a first reference white image using the apparatus camera most closely aligned with a direction that the detected user's face is looking in;
   determine a first white point for the first reference white image; and
   adjust a color composition of the display based, at least in part, on the determined first white point for the first reference white image.

9. The non-transitory program storage device of claim 8, wherein the first transparent mode of a respective camera of the two or more cameras of the apparatus comprises a mode wherein light passes through the respective camera's switchable white reference element to the respective camera's respective image sensor without scattering.

10. The non-transitory program storage device of claim 8, wherein the second diffusive mode of a respective camera of the two or more cameras of the apparatus comprises a mode wherein light passes through the respective camera's switchable white reference element to the respective camera's respective image sensor with scattering.

11. The non-transitory program storage device of claim 8, wherein the one or more processing units are further configured to execute instructions that cause the one or more processing units to determine the first operational mode of the apparatus at predetermined time intervals.

12. The non-transitory program storage device of claim 8, wherein the switchable white reference element of at least one of the two or more cameras of the apparatus comprises at least one of the following: a polymer-dispersed liquid crystal display (PDLC), a reverse mode polymer stabilized cholesteric texture (PSCT), and an electro-wetting display.

13. The non-transitory program storage device of claim 8, further comprising instructions stored thereon to cause the one or more processing units to:
 if the first operational mode is determined to be a camera mode—
  configure the switchable white reference element of the apparatus camera being utilized in the camera mode into the second diffusive mode;
  cause the apparatus to capture a second reference white image using the apparatus camera being utilized in the camera mode;
  determine a second white point for the second reference white image;
  configure the switchable white reference element of the apparatus camera being utilized in the camera mode into the first transparent mode;
  cause the apparatus to obtain a first captured image from the image sensor of the apparatus camera being utilized in the camera mode; and
  adjust a color composition of the first captured image based, at least in part, on the second determined white point for the second reference white image.

14. The non-transitory program storage device of claim 13, further comprising instructions stored thereon to cause the one or more processing units to:
 if the first operational mode is not determined to be a camera mode, and the face of a user of the apparatus is detected, and if the camera most closely aligned with a direction that the detected user's face is currently looking in is not reading greater than a minimum threshold ambient light level, or
 if the first operational mode is not determined to be a camera mode, and no face of a user of the apparatus is detected—
  configure the switchable white reference element of the apparatus camera reading the greatest ambient light level into the second diffusive mode;
  cause the apparatus to capture a third reference white image using the apparatus camera reading the greatest ambient light level;
  determine a third white point for the third reference white image; and
  adjust a color composition of the display based, at least in part, on the third determined white point for the third reference white image.

15. A computer-implemented method, comprising:
 determining a first operational mode of an apparatus, the apparatus comprising:
  two or more cameras, each camera comprising an image sensor and a switchable white reference element configured to switch between a first transparent mode and a second diffusive mode; and
  a display; and
 if the first operational mode is not determined to be a camera mode—
  attempting to detect a face of a user of the apparatus using one or more of the two or more cameras; and
  if the face of a user of the apparatus is detected and if the camera most closely aligned with a direction that the detected user's face is currently looking in is reading greater than a minimum threshold ambient light level—
   configuring the switchable white reference element of the apparatus camera most closely aligned with a direction that the detected user's face is looking in into the second diffusive mode;
   causing the apparatus to capture a first reference white image using the apparatus camera most closely aligned with a direction that the detected user's face is looking in;
   determining a first white point for the first reference white image; and
   adjusting a color composition of the display based, at least in part, on the determined first white point for the first reference white image.

16. The computer-implemented method of claim 15, wherein the second diffusive mode of a respective camera of the two or more cameras of the apparatus comprises a mode wherein light passes through the respective camera's switchable white reference element to the respective camera's respective image sensor with scattering.

17. The computer-implemented method of claim 15, wherein the one or more processing units are further configured to execute instructions that cause the one or more processing units to determine the first operational mode of the apparatus at predetermined time intervals.

18. The computer-implemented method of claim 15, wherein the switchable white reference element of at least one of the two or more cameras of the apparatus comprises at least one of the following: a polymer-dispersed liquid crystal display (PDLC), a reverse mode polymer stabilized cholesteric texture (PSCT), and an electro-wetting display.

19. The computer-implemented method of claim 15, further comprising:
 if the first operational mode is determined to be a camera mode—
  configuring the switchable white reference element of the apparatus camera being utilized in the camera mode into the second diffusive mode;
  causing the apparatus to capture a second reference white image using the apparatus camera being utilized in the camera mode;
  determining a second white point for the second reference white image;
  configuring the switchable white reference element of the apparatus camera being utilized in the camera mode into the first transparent mode;
  causing the apparatus to obtain a first captured image from the image sensor of the apparatus camera being utilized in the camera mode; and
  adjusting a color composition of the first captured image based, at least in part, on the second determined white point for the second reference white image.

20. The computer-implemented method of claim 19, further comprising:
 if the first operational mode is not determined to be a camera mode, and the face of a user of the apparatus is detected, and if the camera most closely aligned with a direction that the detected user's face is currently looking in is not reading greater than a minimum threshold ambient light level, or
 if the first operational mode is not determined to be a camera mode, and no face of a user of the apparatus is detected—
  configuring the switchable white reference element of the apparatus camera reading the greatest ambient light level into the second diffusive mode;
  causing the apparatus to capture a third reference white image using the apparatus camera reading the greatest ambient light level;
  determining a third white point for the third reference white image; and
  adjusting a color composition of the display based, at least in part, on the third determined white point for the third reference white image.

\* \* \* \* \*